United States Patent

Zeiner et al.

[11] Patent Number: 5,829,846
[45] Date of Patent: Nov. 3, 1998

[54] HYDRAULIC BRAKE SYSTEM FOR A MOTOR VEHICLE, HAVING TWO DIAGONAL BRAKE CIRCUITS, INCLUDING AN ANTI-LOCK SYSTEM

[75] Inventors: Peter Zeiner, Stuttgart; Hermann Kaess, Tamm; Andreas Klug, Stuttgart; Martin Borsik, Holzerlingen; Rainer Heinsohn, Tamm; Juergen Breitenbacher, Winterbach, all of Germany

[73] Assignee: Robert Bosch GmbH, Stuttgart, Germany

[21] Appl. No.: 696,859
[22] PCT Filed: Jan. 17, 1995
[86] PCT No.: PCT/DE95/00045
§ 371 Date: Aug. 5, 1996
§ 102(e) Date: Aug. 5, 1996
[87] PCT Pub. No.: WO95/21079
PCT Pub. Date: Aug. 10, 1995

[30] Foreign Application Priority Data

Feb. 4, 1994 [DE] Germany .................. 44 03 445.8

[51] Int. Cl.[6] .................................................. B60T 8/26
[52] U.S. Cl. ............................. 303/113.5; 303/116.1
[58] Field of Search ......................... 303/113.1, 116.1, 303/113.5

[56] References Cited

U.S. PATENT DOCUMENTS

| | | | |
|---|---|---|---|
| 5,021,957 | 6/1991 | Yoshino | 303/113.5 |
| 5,417,483 | 5/1995 | Sigl | 303/113.5 |
| 5,445,445 | 8/1995 | Yukio | 303/113.5 |

FOREIGN PATENT DOCUMENTS

93/25417  12/1993  WIPO .

*Primary Examiner*—Matthew C. Graham
*Attorney, Agent, or Firm*—Edwin E. Greigg; Ronald E. Greigg

[57] ABSTRACT

The brake system includes a first and a second diagonal brake circuit distribution. A first 2/2-way valve is located in a first line between a master cylinder and a wheel brake cylinder of the front axle. On the wheel brake side, a second line, in which a second 2/2-way valve is disposed, branches off from the first line, leading to a wheel brake cylinder of the rear axle. A third line originates between the second multiposition valve and the wheel brake cylinder and has a pump, with which pressure fluid can be fed from the wheel brake cylinders to the master cylinder. Brake force distribution that is dependent on the dynamic axle load shifting, and within limits, individual-wheel brake pressure control if wheel locking threatens, are thus made possible.

1 Claim, 1 Drawing Sheet

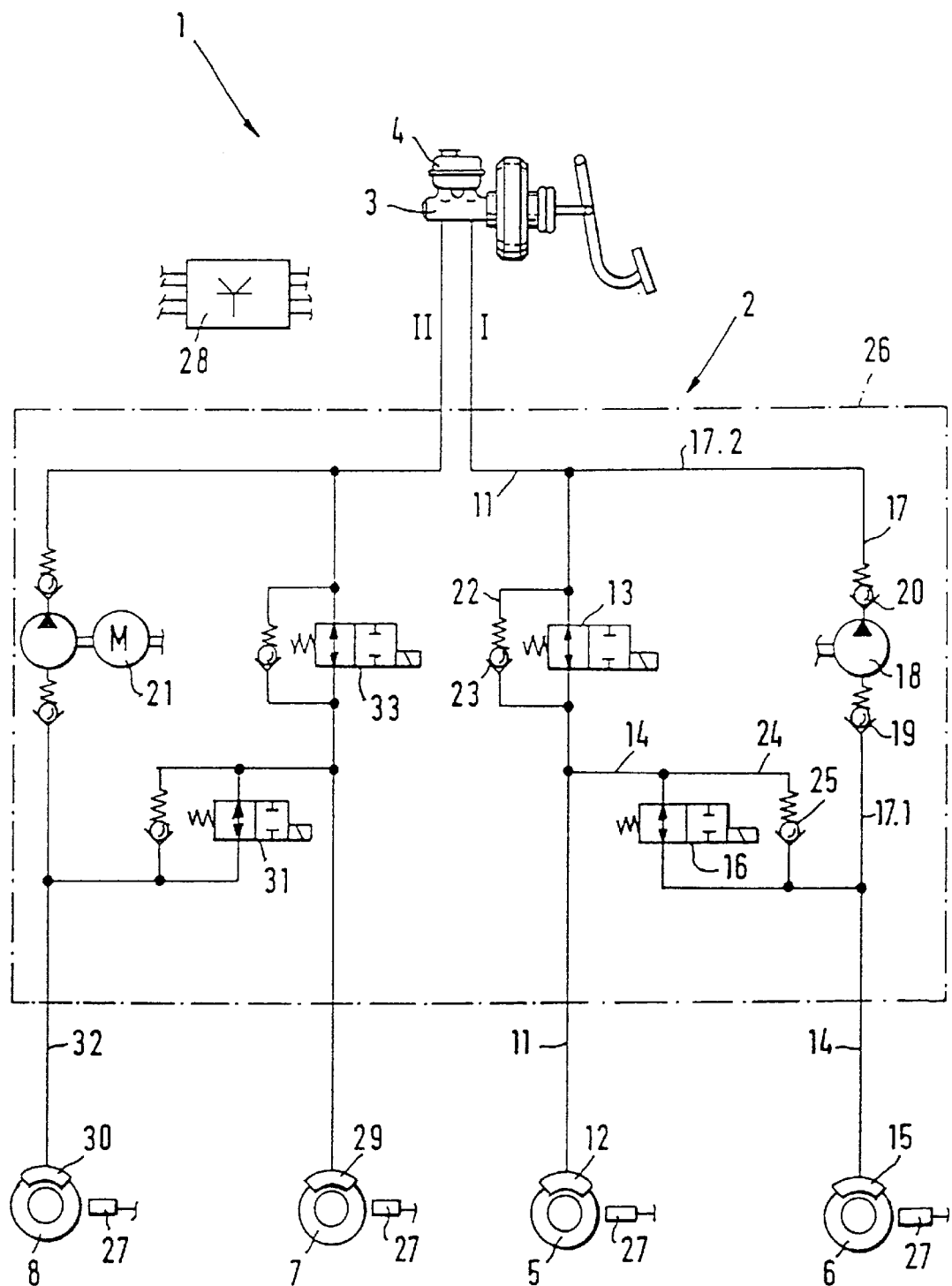

HYDRAULIC BRAKE SYSTEM FOR A MOTOR VEHICLE, HAVING TWO DIAGONAL BRAKE CIRCUITS, INCLUDING AN ANTI-LOCK SYSTEM

PRIOR ART

The invention is based on a hydraulic brake system as generically defined by the preamble to the claim. In such a brake system, the second 2/2-way valve is disposed in the third line. It has a spring-actuated blocking position and an electromagnetic, switchable open position. By suitable switching of the two multiposition valves, and the aid of the pump in the anti-lock control mode, brake pressure modulation in the respective brake circuit is possible; this modulation includes phases for pressure reduction, pressure holding and pressure buildup in the wheel brake cylinders. Individual-wheel pressure control, however, is impossible because of how the valves are equipped. Moreover, to attain the most optimal possible braking action in different vehicle loading states, as a rule a load-dependent pressure reducer is necessary in the second line leading to the respective wheel brake cylinder of the rear axle.

Such hydraulic brake systems are used in passenger cars in the lower price category. These motor vehicles have front-wheel drive and their wheel brakes associated with the rear wheels are relatively greatly relieved in a braking operation. The known, relatively inexpensive brake system in this vehicle price category does not meet all the demands made of it.

ADVANTAGES OF THE INVENTION

The hydraulic brake system of the invention, having the characteristics of the body of the claim, has the advantage over the prior art that with the same number of valves per brake circuit, individual-wheel control is possible within limits both during normal braking and in the anti-lock control mode. Pressure reducers on the rear axle can be omitted. It is moreover possible, with simultaneous pressure reduction at the rear axle, to attain pressure buildup and pressure holding at the front axle, which in certain road surface conditions, such as an abrupt change in the coefficient of friction, brings about improvements in the braking action.

DRAWING

One exemplary embodiment of the invention is shown in the drawing in the form of a circuit diagram of a brake system with an anti-lock system.

DESCRIPTION OF THE EXEMPLARY EMBODIMENT

A hydraulic brake system 1 schematically shown in the drawing is intended for use in a front-wheel-drive passenger car with diagonal brake circuit distribution. The brake system 1 is equipped with an anti-lock system 2. The brake system 1 has a dual-circuit pedal-actuated master cylinder 3 with a pressure fluid reservoir 4. A first brake circuit I is intended for actuating wheel brakes 5 and 6, which are associated with the left front wheel and the right rear wheel of the vehicle. The wheel brakes 7 and 8 of the right front wheel and the left rear wheel are connected to a second brake circuit II. Both brake circuits I and II are equipped identically. Brake circuit I will therefore be described in further detail below.

In brake circuit I, a first line 11 leads from the master cylinder 3 to a wheel brake cylinder 12 of the wheel brake 5 associated with the left front wheel. A first 2/2-way valve 13 is located in the first line 11. It assumes its open position when spring-actuated and its blocking position when electromagnet-actuated. A second line 14, to which a wheel brake cylinder 15 of the wheel brake 6 associated with the right rear wheel is connected, begins at the first line 11 between the first multiposition valve 14 and the wheel brake cylinder 12. A second 2/2-way valve 16 with a spring-actuated open position and an electromagnetically switchable blocking position is located in the second line 14.

Moreover, a third line 17 is provided, having a pump for pumping pressure fluid from the wheel brake cylinders 12 and 15 to the master cylinder 3. The portion 17.1 of the third line 17 leading to the intake side of the pump 18 is connected to the second line 14 between the second multiposition valve 16 and the wheel brake cylinder 15. The portion 17.2 of the third line 17 on the pressure side communicates with the first line 11 between the first multiposition valve 13 and the master cylinder 3. In the third line, there are respective check valves 19 and 20 on the intake and pressure side of the pump 18, which prevent a flow of pressure fluid from the master cylinder 3 to the wheel brake cylinders 12, 15 through the third line 17. The check valves 19 and 20 may be integrated with the pump 18. The pump 18 can be driven by an electric drive motor 21 that is common to both brake circuits I and II.

The first multiposition valve 13 is bypassed by a fourth line 22. Located in this line is a check valve 23 with an opening direction from the wheel brake cylinder 12 to the master cylinder 3. A fifth line 24 is also provided, which bypasses the second multiposition valve 16. A check valve 25 is likewise located in this line 24 and has its opening direction from the wheel brake cylinder 15 to the master cylinder 3. Brake circuits I and II of the brake system 1 contain no further hydraulic elements. The elements mentioned are combined in one hydraulic unit 26, which is represented by the dashed outline in the drawing.

Finally, the anti-lock system 2 also includes wheel rotation sensors 27, assigned to the vehicle wheels, which are connected to an electronic control unit 28. The control unit 28 is intended for flip-dependent switching both of the multiposition valves 13 and 16 and of the pump drive motor 21.

The mode of operation of the brake system 1 is as follows.

Upon braking, brake pressure is built up in the wheel brake cylinders 12 and 15 of the brake circuit I. The same process takes place in the brake circuit II in the wheel brake cylinders 29 and 30, which are associated with the wheel brake 7 of the right front wheel and the wheel brake 8 of the left rear wheel, respectively. As a function of the dynamic axle load distribution, higher brake forces occur at the wheels of the front axle than at the rear axle.

With respect to the effective vehicle speed, these lead to different slip of the wheels of the front axle and the wheels of the rear axle, or to different speeds of the wheel circumference between the wheels of the two axles. This behavior is monitored by the electronic control unit 28 on the basis of the signals of the wheel rotation sensors 27. If the control unit 28 detects an excessive difference in slip or speed between the wheels of the two axles, then it switches the second 2/2-way valves 16 in brake circuit I and 31 in brake circuit II to the blocking position, so that any further brake pressure buildup at the rear axle is prevented. By suitable restraining the pressure at the wheel brake cylinders 15 and 30 of the rear axle, the braking force is adapted during braking to the course of the ideal brake force distribution. A pressure reducer in the second line 14, leading to the wheel brake cylinders 15 and 30 of the rear axle in brake circuit I and 32 in brake circuit II, can therefore be dispensed with.

If the danger of wheel locking occurs during braking, for instance at the right rear wheel, then the anti-lock system 2 functions as follows:

The control unit 28, with the aid of the second multiposition valve 16, blocks the second line 14 and puts the pump 18 into operation. By drawing pressure fluid from the wheel brake cylinder 15 of the brake circuit I, the pump brings about a pressure reduction at the wheel brake 6. In order to raise the brake pressure again once the wheel rotation behavior stabilizes, the control unit 28 switches the second multiposition valve 16 to the open position, so that pressure fluid can flow back from the master cylinder 3 to the wheel brake cylinder 15 while the pump 18 is operating.

If the danger of wheel locking occurs at the left front wheel during braking, the following steps are taken: For brake pressure reduction, the first multiposition valve 13 in brake circuit I is closed, and the pump 18 is put into operation. The pump feeds pressure fluid from both wheel brake cylinders 12 and 15 of brake circuit I to the master cylinder 3. For building pressure up again at the two wheel brakes 5 and 6, the first multiposition valve 13 is changed to the open position, and with the pump 18 continuing to feed, the pressure fluid flows from the master cylinder 3 to the wheel brake cylinders 12 and 15.

With the anti-lock system 2, it is possible during pressure reduction at the rear axle with the two multiposition valves 16 and 31 in the blocking positions to attain a simultaneous pressure build up at the front axle by supplying pressure fluid from the master cylinder 3, through first multiposition valves 13 in brake circuit I and 33 in brake circuit II that are switched to the open position, to the wheel brake cylinders 12 and 29 of the front axle. During this pressure reduction at the rear axle, the pressure at the front axle can also be maintained unchanged by switching the first multiposition valves 13 and 33 to the blocking position. In certain road surface conditions, such as a sudden change in the coefficient of friction, these provisions can improve the braking action.

We claim:

1. A hydraulic brake system (1) for a motor vehicle, said hydraulic brake system having:

two diagonal brake circuits (I, II), front and rear wheel brake cylinders and an anti-lock system (2), a dual-circuit master cylinder (3), with a first line (11), leading in the respective brake circuit (I; II) from the master cylinder (3) to the wheel brake cylinders (12, 29) of a front axle of the vehicle, an electromagnetic first 2/2-way valve (13, 33) of the anti-lock system (2) in the first line (11) that is open upon spring actuation and switchable electromagnetically to a closed position, a second line (14) that leads from the first line (11) between the first 2/2-way valve (13, 33) and the wheel brake cylinders (12, 29) of the front axle, to the wheel brake cylinders (15, 30) of the rear axle of the vehicle, an electromagnetic second 2/2-way valve (16, 31) of the anti-lock system (2) in the second line (14) of the respective brake circuit I, II that is open upon spring actuation and switchable electromagnetically, a third line (17), connected to the second line (14) and to the first line (11) between the first 2/2-way valve (13, 33) and the master cylinder (3), a pump that pumps pressure fluid from the wheel brake cylinders (12, 15 and 29, 30) to the master cylinder (3) is disposed in the third line, wherein the wheel brake cylinders (15, 30) of the rear axle of the vehicle communicate directly with an intake side of the pump (18) through a portion (17.1) of the third line (17) connected to the second line (14) between the second 2/2-way valve (16, 31) and the wheel brake cylinders (15, 30) of the rear axle, a fourth line (22) bypasses the first 2/2-way valve (13, 33) in the first line (11) and a check valve (23) is disposed with its opening direction from the wheel brake cylinder (12, 29) of the front axle to the master cylinder (3), and an electronic control unit (28) of the anti-lock system (2) is provided for slip-dependent switching of the first and second 2/2-way valves (13, 33 and 16, 31) and of the pump drive (21), only the second 2/2-way valve (16), with a check valve (25) opening toward the wheel brake cylinder (12) of the front axle, in a parallel circuit is received in the second line (14), the second 2/2-way valve (16) assumes an open position under spring actuation and a blocking position under electromagnet actuation, so that in a currentless state of the first and second 2/2-way valve (13, 16), a pressure-fluid-carrying connection always exists between the master cylinder (3) and the wheel brake cylinder (15) of the rear axle of the vehicle.

* * * * *